United States Patent [19]

Rice

[11] Patent Number: 5,730,878
[45] Date of Patent: Mar. 24, 1998

[54] CONTAMINATED WASTE-WATER TREATMENT METHOD AND DEVICE

[76] Inventor: Terry Rice, P.O. Box 122, Moccasin, Calif. 95347

[21] Appl. No.: 579,837

[22] Filed: Dec. 28, 1995

[51] Int. Cl.$^6$ ........................................... C02F 9/00
[52] U.S. Cl. .................. 210/662; 210/669; 210/694; 210/96.1; 210/104; 210/257.1; 210/258; 210/259; 210/265; 210/266
[58] Field of Search ........................ 210/662, 669, 210/694, 799, 802, 804, 806, 96.1, 104, 109, 257.1, 259, 265, 266, 258

[56] References Cited

U.S. PATENT DOCUMENTS

| | | | |
|---|---|---|---|
| 3,937,662 | 2/1976 | Bartik | 210/104 |
| 4,177,021 | 12/1979 | Niedermeyer | 417/424 |
| 4,405,458 | 9/1983 | McHugh | 210/242.3 |
| 4,954,265 | 9/1990 | Greenberg et al. | 210/737 |
| 5,411,665 | 5/1995 | Scraggs et al. | 210/802 |
| 5,490,933 | 2/1996 | LaPack et al. | 210/603 |

OTHER PUBLICATIONS

"Engineering Clear Solutions for Enviromental Clean–Up", Facet International, (Date Unknown).

"NDP–20 Series Pumps", Yomada america, Inc. (Date Unknown).

"Model 8 Filter Housing with Quick Opening Clamp Cover", Rosendale Products, Inc., Catalog RP8–100 394–10M, Printed in the U.S.A. (Date Unknown).

Primary Examiner—Ivars Cintins
Attorney, Agent, or Firm—Limbach & Limbach L.L.P.

[57] ABSTRACT

A waste-water treatment device that includes a coalescing plate separator (CPS) for receiving waste-water and for specific gravity separation of hydrocarbon fluids and particles having a lower specific gravity than water from the waste-water. The CPS includes a series of plates having holes formed in ridges, where the hydrocarbon fluids rise through the holes to the surface of the waste-water in the CPS. A skimmer skims off the hydrocarbon fluids from the surface of the waste-water in the CPS and stores these fluids in an oil/product recovery tank. A particle filter receives the waste-water from the CPS and filters out suspended solids from the waste-water. A granulated activated carbon filter receives the waste-water from the particle filter and removes organic hydrocarbons from the waste-water.

13 Claims, 3 Drawing Sheets

CONTAMINATED WASTE-WATER TREATMENT METHOD AND DEVICE

FIELD OF THE INVENTION

The present invention relates to a waste-water treatment process, and in particular, to a portable system for removal of hydrocarbon based contaminants from storm water and industrial waste-water. These contaminants include but are not specifically limited to gas, oil, diesel fuels, solvents and paint thinners.

BACKGROUND OF THE INVENTION

Each year, large quantities of sediment and other contaminants enter surface waters (such as streams, rivers, lakes etc.) due to rainwater runoff. In the United States, much of the water that falls during rainstorms goes directly to surface bodies of water by dedicated storm sewers. Oil, grease, antifreeze and other related hydrocarbon based materials are contained in these flows due to storm water runoff from streets, parking lots and other sources of industrial traffic. Further, contaminated waste-water is discharged into surface waters from construction and industrial activities.

Many communities utilize surface water for their drinking water supplies, and contaminants can be very difficult to remove to meet drinking water standards. It has long been recognized that treating these contaminant sources at the point source can be the most efficient means of removal of these pollutants.

On-site waste-water treatment processes are especially needed due to the volume of water now requiring de-contamination, and the variety of decontamination sites. Until recently, storm water discharges were not regulated, in part because these discharges are basically non point in nature (not from a single identifiable source), and in part because industrial and Private Owned Treatment Works (POTW) discharges produce large and readily defined regulated flows. As regulation of point sources has progressed, regulators have increasingly turned to regulating non point sources, such as storm water discharges from streets, parking lots, etc. This effort began in 1987 when amendments to the Clean Water Act (CWA) prohibited non-stormwater discharges into storm sewers, and dry weather discharges from industrial sites, without a National Pollution Discharge Elimination System (NPDES) permit. Under the NPDES permit terms as set by amended Section 402 of the CWA, the Environmental Protection Agency (EPA), or states with EPA approved programs, can grant discharge permits for industrial activities and sites with storm water runoff. Activities that do not have permits are liable for fines levied by the EPA in excess of $25,000 per day per discharge.

Typically, waste-water is stored in enclosed holding tanks and drainage sumps until the waste-water is treated to remove the contaminants therein. Numerous methods have been developed for the removal of wastes from waste-water.

One such method is to store large amounts of storm water in tanks for removal by licensed hazardous waste contractors. This method, however, requires regular waste-water removal, and personnel and equipment required to remove all of the waste-water. Depending on the size of the storm event or other industrial discharge, waste-water can be generated in vast amounts. Combined with the cost of transportation and disposal, capital and recurring costs for this method of waste-water purification are extremely high.

Given the cost of transportation of high volumes of waste-water, on-site removal of contaminants is now a popular method of waste-water treatment. If contaminants can be removed from the waste-water, the waste-water can be disposed of on site, and only the contaminants need be transported to a proper disposal facilities. It is important, however, that such waste-water treatment systems be simple to operate so as to enable those relatively unskilled in the art of waste-water treatment to practice the waste-water treatment process on site. Simplicity of operation is also an important factor in keeping the cost of water treatment to a minimum.

Numerous methods have been developed for on site removal of wastes from waste-water. For example, agents such as chemical, polymer, oxidizers and PH adjusters have been added to waste-water that chemically react with the contaminants. Chemical processes, however, often have the disadvantage of being time consuming and requiring complex reaction installations resulting in high capital cost. Further, qualified, licensed personnel trained in waste-water management are also required, further raising the cost of treatment. Many of these chemicals are considered hazardous materials by the Department of Toxic Substance Control (DTSC) and can pose their own hazards in storage, worker safety and possible release into the environment by accidental spills. In addition, chemical methods commonly cause the formation of gaseous wastes that also require proper disposal.

Chemical treatment is also insufficient in that it fails to remove fine suspended solids, which is also necessary for meeting CWA regulations for surface water. Current PTW regulations call for no more than 50–100 parts per million of suspended grease and oil contaminants be contained in treated waste-water released back into the environment or into storm drains. The common practice for removing these suspended solids is the addition of chemical agents that are capable of bonding to the fine particles, such as aluminum sulfate, calcium hydrate compositions and sodium aluminate which are commonly used as chemical flocculating agents. Chemical flocculating agents, however, do not effectively remove solubilized waste components. They also can pose problems of storage and handling because some of these agents are hazardous materials.

Another method for removal of contaminants from waste-water involves recharge basins. These basins allow storm water to pool and be slowly released back into the ground water supply through aquifers. A disadvantage of this process, however, is the possibility of contaminating the aquifer with pollutants from the storm water. Further, recharge basins cannot be moved from site to site to meet changing waste-water purification needs.

Water evaporation processes that yield a concentrated composition of waste contaminants have also been employed as a purification method. Water evaporation, however, has the disadvantage of being energy intensive, thus rendering this method of purification economically impractical. In addition, evaporation technologies are not energy efficient or resource efficient where water is expensive or in short supply.

Particle filtration is one more method that has been used to remove contaminants from waste-water. Reverse osmosis, which is ultra-fine filtration at high pressure using ceramic, filters out particles greater than about 2 microns in size. The problem with reverse osmosis is that the flow rate is too low to effectively treat large quantities of waste-water. Sand filters have also been used, but these filters also have a low flow rate, combined with the problem that they only filter out particles greater than about 50 microns.

With the growing number of waste-water storage sites, there is a need for a filtration method and device that can be easily transported from storage site to storage site and can quickly, simply and economically remove contaminants from waste-water stored at each site to well below the PTW requirement of 50-100 parts per million.

SUMMARY OF THE INVENTION

The present invention is an integrated, mobile waste-water separation device for the removal of oil, grease, gas, diesel, solvents and all other related hydrocarbon pollutants from waste-water. The present invention solves the aforementioned problems by mechanically removing contaminants to meet current regulations, without the use of chemicals. This invention also provides the flexibility of being easily moved from site to site.

The waste-water treatment device of the present invention includes a coalescing plate separator for receiving the waste-water and for specific gravity separation of fluids and particles having a lower specific gravity than water from the waste-water. The fluids rise to the surface of said waste-water in the coalescing plate separator. A skimmer skims off the fluids from the surface of the waste-water in said coalescing plate separator. A particle filter receives the waste-water from the coalescing plate separator and filters out suspended solids from the waste-water. A granulated activated carbon filter receives the waste-water from the particle filter means and removes organic hydrocarbons from the waste-water.

The particular combination of the coalescing plate separator, particle filter and granulated activated carbon filter efficiently removes contaminants from the waste-water without excessive clogging of filters and depletion of activated carbon.

Other objects and features will become apparent by a review of the specification, claims and appended figures.

DETAILED DESCRIPTION OF THE PREFERRED EMBODIMENTS

Figure 1:
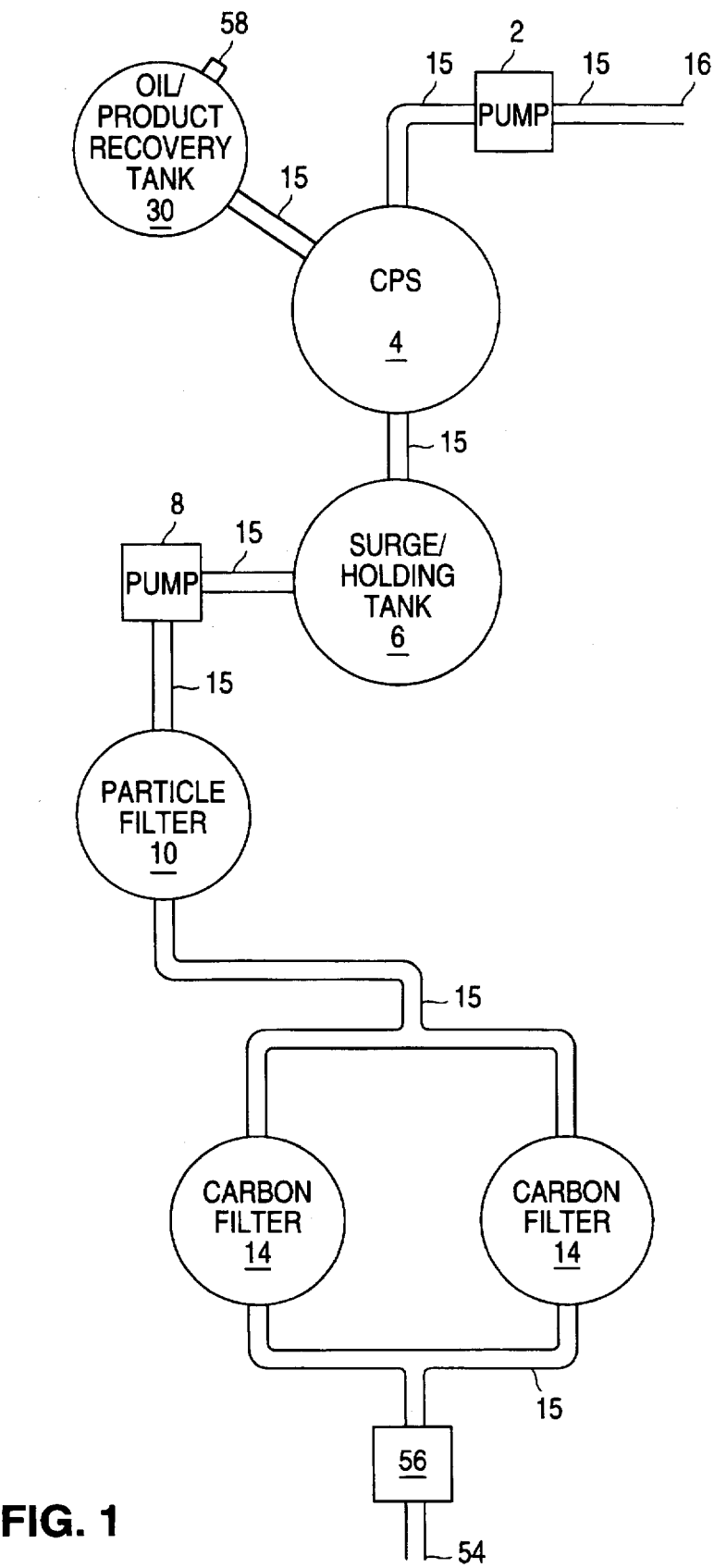
FIG. 1 is a top plan view of the water purification system of the present invention.

The present invention is a simple, rapid, efficient and inexpensive process and device enabling on-site and site-to-site purification of large volumes of waste-water. The preferred embodiment of the waste-water purification device of the present invention is illustrated in FIG. 1, and includes a first pump 2, a coalescing plate separator (CPS) 4, a surge/holding tank 6, a second pump 8, a particle filter 10, and granulated activated carbon canisters 14. All these components are connected together with pipes 15, preferable PVC pipes.

First pump 2 pumps waste-water from a system inlet 16 to the coalescing plate separator (CPS) 4. Preferably, first pump 2 is an air diaphragm pump which is operated using compressed air from a compressor (not shown). The air diaphragm type pump is ideal because it induces the least amount of turbulence in the pumped water.

Figure 2A:
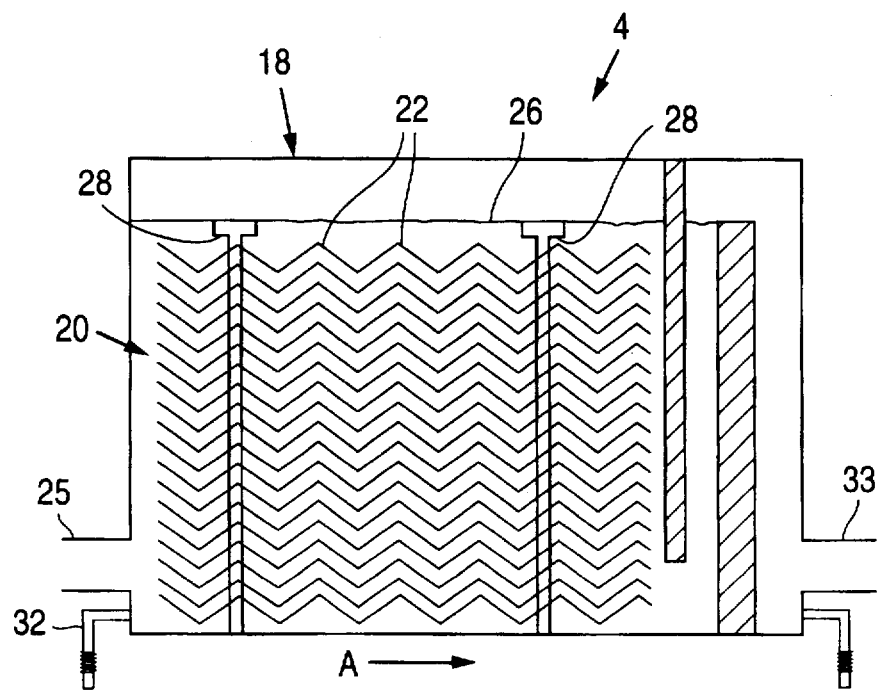
FIG. 2a is a cross-sectional side view of the CPS portion of the present invention.
Figure 2B:
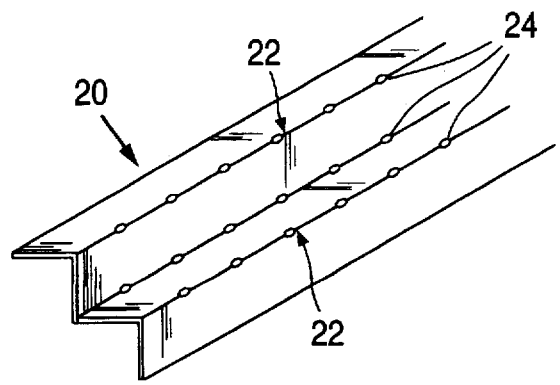
FIG. 2b is a perspective view of a plate of the CPS portion of the present invention.

The coalescing plate separator (CPS) 4 provides enhanced specific gravity separation of the waste-water. CPS 4 is illustrated in FIGS. 2a and 2b, and includes corrugated separator plates 20 stacked inside a housing 18. Plates 20 are preferably plastic and form a plurality of ridges 22 with small holes 24. The waste-water pumped by first pump 2 enters through a CPS inlet 25 in the side of CPS housing 18, and travels across CPS 4 between plates 22 (in the direction of Arrow A) and out CPS outlet 33. Oil droplets entering the plates are of various sizes. As the waste-water flows through the plates, the oil droplets rise in the water by specific gravity (because the oil is lighter than the water), coming in contact with the undersides of the plates 20 and coalescing to form a thin film of oil. The film flows upward to the top of the ridges 22 and passes through holes 24 to the next plate 20. Eventually, the oil/hydrocarbon droplets move to the surface 26 of the waste-water. One or more adjustable skimmers 28 have openings at the surface level of the waste-water to skim the hydrocarbon fluids off the surface of the waste-water and into an oil/product recovery tank 30. These fluids are contained in the oil/product recovery tank 30 for later disposal by a hazardous waste disposal contractor. The preferred embodiment uses a CPS 4 made by Facet international, Tulsa, Okla., under the model number MCS-21 MPak. However, other separator designs can be used instead of the ridged plate design described above, such as fiber meshes, round tubes, fiberglass beads, etc.

The CPS housing 18 must be perfectly level to operate successfully. In the preferred embodiment, the leveling of CPS 4 is accomplished by leveling jacks 32 that support the bottom side edges of the CPS housing 18. Once the system is ready for use, the leveling jacks are used to adjust the level of each side of the CPS 4. A bubble level (not shown) may be attached to the top of the CPS 4 to facilitate the leveling process. When the system is moved to a new site, jacks 32 can be lowered to fully secure CPS 4 during transportation.

In the preferred embodiment, the waste-water from the CPS 4 flows by gravity out CPS outlet 33 and into the surge/holding tank 6. The gravity drain prevents churning up the waste-water in CPS 4, and allows CPS 4 to operate with an even flow rate. The rest of the system may have a higher flow capacity than the CPS 4, but CPS 4 requires an even flow rate of the waste-water within a particular flow rate range to provide optimal specific gravity separation. Therefore, holding tank 6 is also provided in order to eliminate the need for continuous pumping of the waste-water exiting the CPS 4 to the rest of the water treatment system. By providing holding tank 6, the flow of the waste-water to the rest of the system can be intermittently turned off while holding tank 6 fills.

Figure 3:
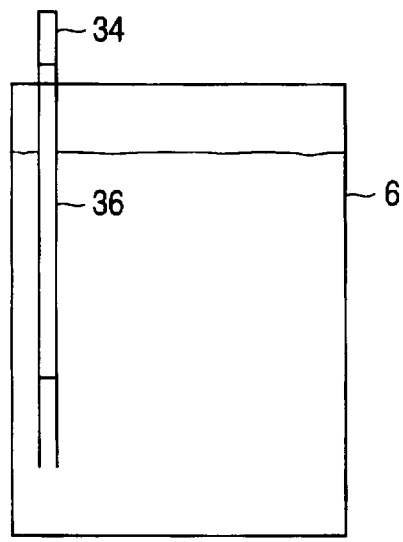
FIG. 3 is a cross-sectional side view of the surge/holding tank portion of the present invention.

Holding tank 6 has a water level measuring device that activates second pump 8 (preferably an air diaphragm pump) when the level of waste-water in holding tank 6 reaches a predetermined level, and deactivates second pump 8 when the level drops below a second predetermined level. In the preferred embodiment, the water level measuring device includes an air pressure detector 34 attached to the end of a pipe 36 that is mounted inside holding tank 6, as illustrated in FIG. 3. As the water level rises in holding tank 6, pressure rises in the pipe 36. When the water level, and thus the pressure, rises to a pre-set level in pipe 36, air pressure detector 34 activates second pump 8.

Figure 4:
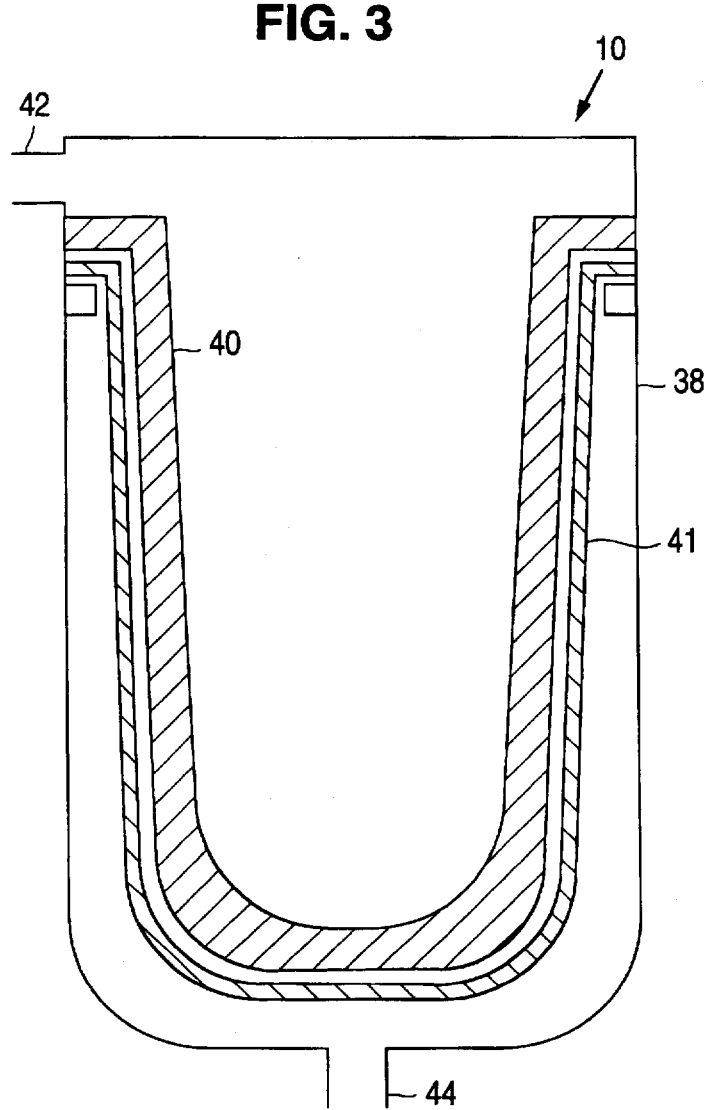
FIG. 4 is a cross-sectional side view of the particle filter portion of the present invention.

When second pump 8 is activated, it pumps water from surge/holding tank 6 into particle filter 10. Particle filter 10 can be any filter that removes fine suspended solids sized down to about 5 microns that were not removed by the CPS 4. The particle filter 10 in the preferred embodiment is a 5 micron "bag" filter, as illustrated in FIG. 4. The bag filter includes a stainless steel housing 38, a muslin bag (spun fiber) filter core 40 (such as model O-S-25 filter from Rosedale Bag Filter), and a stainless steel basket 41 for supporting bag filter core 40. Waste-water enters through inlet 42, passes through filter core 40 and basket 41, and exits through outlet The last step in the water treatment process of the present invention is to pass the waste-water exiting particle filter 10 through granulated activated carbon. The preferred embodiment uses two granulated activated carbon filter canisters 14 connected in a parallel configuration so as to reduce back pressure in the system. The activated carbon contained in canisters 14 removes organic hydrocarbons that are too light to be removed by the previous filtering processes. These carbon canisters 14 are of the type supplied by companies that deal in industrial water treatment, such as West States Carbon in Oakland, Calif.

The final water exiting the carbon filter canisters 14 exits a system outlet 54, where the water is disposed of into either a sanitary sewer or storm drain. Effluent levels can be analyzed using an infrared spectrometer 56 to assure that discharges are meeting current and local regulations.

A water level detector 58 can be added to oil product recovery tank 30 for measuring the level of fluids skimmed from CPS 4 into tank 30. When the oil product recovery tank 30 becomes full, water level detector 58 shuts down second pump 8 to prevent spillage. The level detector 58 of the preferred embodiment also uses a pipe and air pressure detector design similar to the level detector in the surge/holding tank 6.

The above described waste-water separation system is portable both within the treatment site and from site to site. The system can be arranged to fit in a relatively compact space, such as an 18 foot stock trailer. The transportability of the instant invention presents a significant advantage over stationary systems, as most sites do not generate constant quantities of waste-water. The portability is especially ideal for rural locations that require only occasional purification of waste-water. If larger quantities of waste-water are generated, this unit could also serve as a stationary unit.

The present invention provides several advantages over the prior art. The instant invention provides an operationally simple process for the removal of grease, oils, diesel, solvents and other related hydrocarbons from contaminated storm water. The invention is also energy efficient, only requiring electrical energy to power a compressor to supply air to the two air diaphragm pumps 2,8. The water treatment process of the present invention is also operational on a larger scale, enabling the processing of up to 70,000 gallons per day by using larger pumps and air compressor. The process is also operationally simple, capable of automated operation which eliminates the need for skilled operators.

The combination of the CPS, particle filter and activated carbon provides for water treatment down to 5 parts per million at a sufficient flow rate without excessive downtime caused by a clogged particle filter or excessive depletion of the activated carbon. If the CPS were not used, the particle filter would clog almost immediately from the excessive amounts of oil. If the particle filter were not used, then the activated carbon would be depleted too quickly, resulting in the emulsified oils breaking through the activated carbon filters 14 and into the outputted waste-water, and/or the activated carbon canisters requiring constant replacement and disposal. With the combination of the CPS, particle filter and activated carbon, a maximum amount of water can be treated without excessive replacement of the particle filter or activated carbon. After waste-water treatment by this invention, the oil in the tank 30 (a small fraction of the volume of the water exiting out the device) is drained and disposed of at a proper hazardous waste facility. The particle filter 40 is easily removable from the filter housing 38 for disposal, and the activated carbon is easily removable from canisters 14 for disposal or for recycling.

An embodiment of the present invention that is currently being developed for commercial use employs a 120 gallon CPS made by Facet International, under the model number MCS-21 MPak. The Facet CPS has a rated flow rate of 30 gallons per minute. Pumps 2 and 8 are diaphragm pumps made by Yamada America Inc. under the model number NDP-20, which require 9 cubic feet of air per minute to pump a maximum of 27 gallons per minute. Surge/holding tank 6 has a 100 to 200 gallon capacity. Particle filter 10 is a bag filter, model O-S-25, from Rosedale Bag Filter. The bag filter is a 24" spun fiber filter contained in a stainless steel basket strainer, and filters out particles down to 5 microns at a maximum flow rate of 30 gallons per minute. Carbon filter canisters 14 each contain 180 pounds of granulated activated carbon (GAC), and treat about 30 gallons of water per minute. This embodiment of the present invention treats about 27 gallons of waste-water a minute with the treated water exiting the device containing less than 5 parts per million of hydrocarbon based waste particles.

The above described separation system can be scaled up or down depending on the needs of the user. Furthermore, is it within the skill of one in the art to arrange multiple separators, pumps and filters in parallel in order to accommodate the filtration of greater volumes per unit time.

It is to be understood that the present invention is not limited to the sole embodiment described above and illustrated herein, but encompasses any and all variations falling within the scope of the appended claims.

What is claimed is:

1. A treatment device for purifying waste-water, comprising:

a coalescing plate separator means for receiving the waste-water and for specific gravity separation of fluids and particles having a lower specific gravity than water from the waste-water, said fluids rising to the surface of said waste-water in said coalescing plate separator means;

a surge/holding tank for receiving by gravity the waste-water from said coalescing plate separator means;

a particle filter means for receiving the waste-water from said surge/holding tank and for filtering out suspended solids from the waste-water;

a granulated activated carbon filter for receiving the waste-water from said particle filter means and for removing chemicals from the waste-water;

a first air diaphragm water pump for pumping water from said surge/holding tank to said particle filter;

a first water level detector means for detecting the level of the waste-water in said surge/holding tank, and for turning on said first water pump when said detected level exceeds a predetermined amount;

a plurality of leveling jacks for adjustably supporting and levelling said coalescing plate separator; and pipe means for directing waste-water exiting from said coalescing plate separator means to said surge/holding tank, and directing waste-water exiting from said surge/holding tank to said particle filter means, and directing waste-water exiting from said particle filter means to said granulated activated carbon filter, wherein the waste-water passes through each of said coalescing plate separator means, said particle filter means, and said granulated activated carbon filter only once.

2. The treatment device of claim 1, wherein said particle filter means includes a bag filter means for filtering out particles greater than about 5 microns.

3. The treatment device of claim 2, wherein, said first water level detector means comprises means for shutting off said first water pump when said detected level drops below a second predetermined amount.

4. The treatment device of claim 3, wherein said level detector includes a pipe having an open end disposed within the surge holding tank and an air pressure detector disposed at an opposite end to said open end for measuring the air pressure in said pipe, such that as the waste-water level rises in said holding tank, pressure in said pipe rises, said air pressure detector activating said first water pump when said pressure rises past a predetermined amount.

5. The treatment device of claim 2, wherein said bag filter means includes a housing and a filter core therein, said filter core being a muslin bag made of spun fiber.

6. The treatment device of claim 1, further comprising:
an oil product recovery tank for receiving said fluids from the surface of said waste-water in said coalescing plate separator means.

7. The treatment device of claim 6, further comprising:
a second water pump to deliver the waste-water from a system inlet to said coalescing plate separator means.

8. The treatment device of claim 7, further comprising:
a second water level detector means for detecting the level of the waste-water in said oil product recovery tank, and for turning off said second water pump when said detected level in said oil product recovery tank exceeds a third predetermined amount.

9. The treatment device of claim 8, further comprising:
an infrared spectrometer means for monitoring the waste-water exiting said granulated activated carbon filter.

10. The treatment device of claim 8, wherein said coalescing plate separator includes a plurality of corrugated plates with ridges formed thereon, said ridges forming holes therein to enhance separation of hydrocarbon particles by specific gravity separation.

11. A method of purifying waste-water, comprising the steps of:

separating fluids having a lower specific gravity than water from the waste-water by specific gravity separation using a coalescing plate separator that is adjustably supported and leveled by a plurality of leveling jacks, said fluids rising to the surface of said waste-water in said coalescing plate separator; and then receiving by gravity the waste-water from said coalescing plate separator in a surge/holding tank; and then pumping water from said surge/holding tank to a particle filter with an air diaphragm water pump;

filtering suspended solids from the waste-water from said surge/holding tank using said particle filter;

detecting the level of the waste-water in said surge/holding tank using a water level detector means which turns on said water pump when said detected level exceeds a predetermined amount; and filtering chemicals from the waste-water from the particle filter using a granulated activated carbon filter;

wherein the waste-water passes through each of said coalescing plate separator means, said particle filter means, and said granulated activated carbon filter only once.

12. The method of claim 11, wherein the filtering step involving said particle filter is performed by a fiber bag filter for filtering out particles greater than about 5 microns.

13. The method of claim 12, further comprising the step of:

monitoring the waste-water, after the step of filtering the chemicals using the granulated activated carbon filter, with a spectrometer means for effluent levels of hydrocarbon particles in the waste-water.

* * * * *